US008307032B2

(12) United States Patent
Omidyar et al.

(10) Patent No.: US 8,307,032 B2
(45) Date of Patent: Nov. 6, 2012

(54) APPARATUS AND METHOD FOR GENERATING GROUPS IN A SOCIAL NETWORK

(75) Inventors: Pierre Omidyar, Honolulu, HI (US); Randy Ching, Honolulu, HI (US)

(73) Assignee: Peer News LLC, Honolulu, HI (US)

( * ) Notice: Subject to any disclaimer, the term of this patent is extended or adjusted under 35 U.S.C. 154(b) by 214 days.

(21) Appl. No.: 12/751,817

(22) Filed: Mar. 31, 2010

(65) Prior Publication Data

US 2010/0257246 A1   Oct. 7, 2010

Related U.S. Application Data

(60) Provisional application No. 61/166,197, filed on Apr. 2, 2009.

(51) Int. Cl.
  *G06F 15/16*   (2006.01)

(52) U.S. Cl. .......................................... 709/204; 709/203
(58) Field of Classification Search ........... 709/203–207
  See application file for complete search history.

(56) References Cited

U.S. PATENT DOCUMENTS

2009/0307003 A1* 12/2009 Benyamin et al. ................. 705/1
2010/0235235 A1*  9/2010 Hosseini et al. ........... 705/14.49

* cited by examiner

*Primary Examiner* — David Lazaro
(74) *Attorney, Agent, or Firm* — Cooley LLP

(57) ABSTRACT

A computer readable storage medium includes executable instructions to receive from a user a request related to an area of interest. A group is generated for the user based on the request. Generating the group includes identifying domain users knowledgeable in the area of interest and combining the user and the domain user to form the group. The group is delivered to the user. In particular, user information posted by the group is displayed to the user.

5 Claims, 5 Drawing Sheets

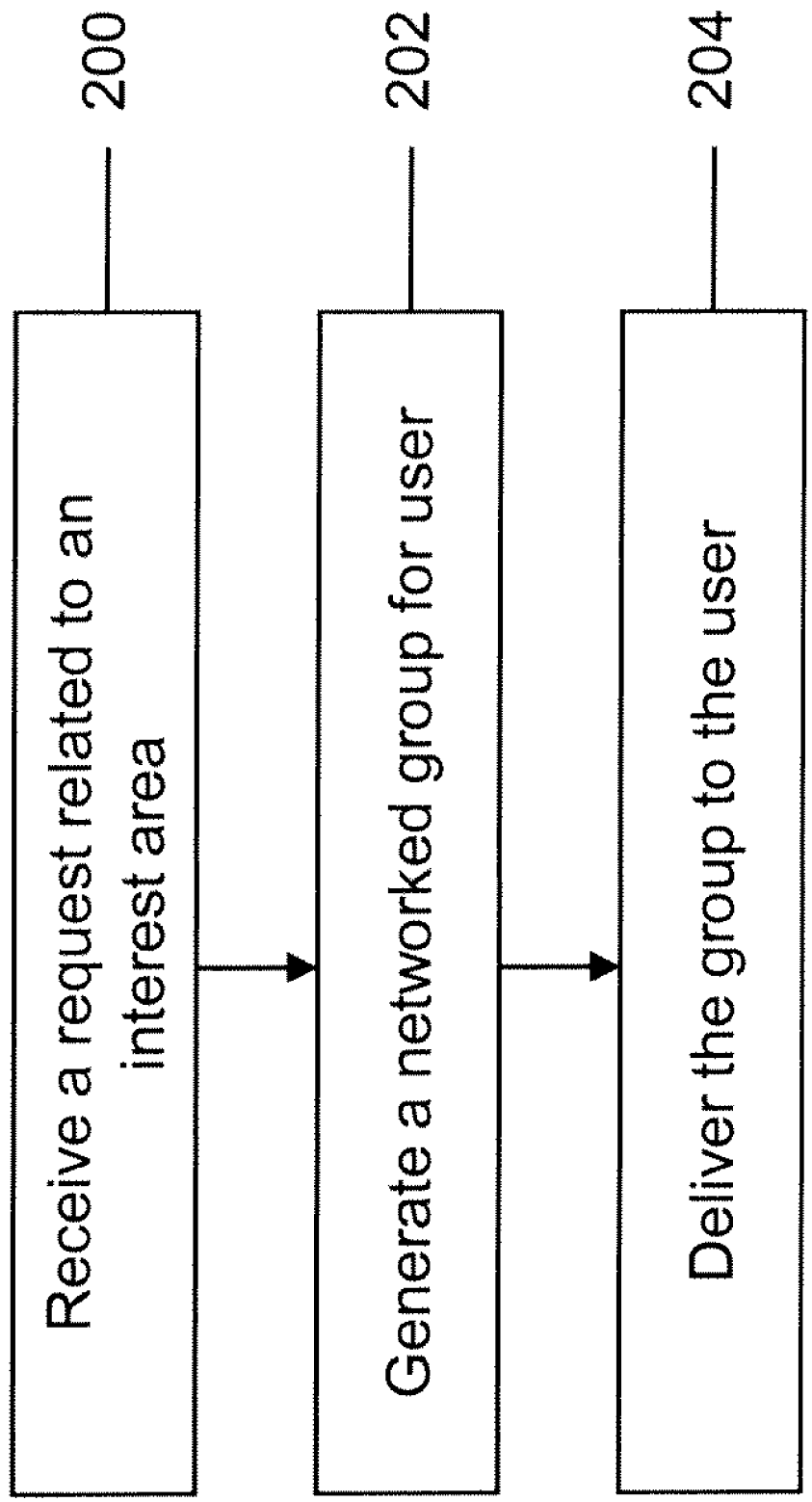

Welcome, randyching | Public profile | News | Sign out

Ginx Groups: Share & Discover!

Groups enables you to easily find people to follow and share your passion with others. Here's how it works:

> Alice: *"I don't know who to follow!"*
>
> Bob: *"Follow these 10 people. I put them into a Group for you."*
>
> Alice: *"Neat, I followed your Group and they all show up in my timeline!!! So easy!"*

Not sure who to follow? Groups let your friends, the people you trust, group people who they feel are interesting users to listen to. Simply follow a Group and you instantly see all updates from Members in the Group in your timeline. All in one click. Don't worry, if you ever need a break from a Group, just filter that Group out of your timeline. Learn more about Following a Group.

Have a passion? Of course you do, everyone is passionate and knowledgeable about something. As a Group Owner, you get to share your expertise with the world by grouping users you find informative and interesting. Groups are an easy way to introduce your friends to topics that you're passionate about. Learn more about Creating a Group.

View Mobile Version

About | News | Privacy | TOS | FAQ

Copyright © 2008–2009 Peer News Inc. All rights reserved.

Ginx
Pre-alpha

Updates from People You're Following

Home | Replies | Direct Messages | Everyone

Synced about 2 minutes ago.

newmediajim @tpeek safe travel!! about 1 minute ago wilshipley Why can't you do it? Why can't you set your monkey free? Always giving into it - Do you love your monkey or do you love me? about 2 minutes ago [in ginxpicks]

newmediajim @Ed ??? gosh, I don't know. about 3 minutes ago in reply to Ed stevecase Very proud of work of ABC2, started by my late brother Dan. More hope now! RT @curebraintumors Please RT! http://ow.ly/nzX about 3 minutes ago [in ginxpicks]
http://ow.ly/nzX ted2009 Exclusive on the TED Blog: Jill Tarter talks about how, where and why she looks for ET life http://tinyurl.com/dajp9x about 16 minutes ago [in ginxpicks]
TED Blog: An interview with TED Prize-winner Jill Tarter of SETI
http://blog.ted.com/2009/02/an_interview_wi.php

Show
☐ Only updates with links
Your groups
☑ ginxpicks
[Update]

Tips
With Friends
See your friends' timelines just as they see it. Go to a Ginx user's public profile and click on the With Friends tab.

We auto-shorten URLs. Paste your URL in the message box and we will shorten it when posting. Only one URL per message, please!

Conversations
If you see *in reply to* or *started a conversation after*

Fig. 5

APPARATUS AND METHOD FOR GENERATING GROUPS IN A SOCIAL NETWORK

CROSS REFERENCE TO RELATED APPLICATIONS

This application claims priority to U.S. Provisional Patent Application No. 61/166,197 filed on Apr. 2, 2009 entitled, "Apparatus and Method for Generating Groups in a Social Network", the contents of which are incorporated herein by reference.

FIELD OF THE INVENTION

The present invention relates generally to online social networks and more particularly to an apparatus and method for generating groups in such a social network.

BACKGROUND OF THE INVENTION

An online social network comprises a community of users that share their knowledge and experiences. Online social networks are commonly based on shared interests, such as, professional, recreational, social, academic, political, geographic and cultural interests.

A user expanding into a new area of interest may not have expertise in that new area, but may have a friend that does. It would be desirable to leverage the trust and knowledge of that friend to form a group in the new area of interest.

SUMMARY OF THE INVENTION

The invention includes a computer readable storage medium with executable instructions to receive from a user a request related to an area of interest. A group is generated for the user based on the request. Generating the group includes identifying domain users knowledgeable in the area of interest and combining the user and the domain user to form the group. The group is delivered to the user. In particular, user information posted by the group is displayed to the user.

BRIEF DESCRIPTION OF THE FIGURES

The invention is more fully appreciated in connection with the following detailed description taken in conjunction with the accompanying drawings, in which:

FIG. 2 is a flowchart illustrating exemplary operations performed to generate a group in accordance with one embodiment of the present invention.

FIG. 3 is a screen display that describes information related to creating a group in accordance with one embodiment of the present invention.

FIG. 4 is a screen display that displays an exemplary group generated in response to a request from a user in accordance with one embodiment of the present invention.

FIG. 5 is a screen display that displays a time-line of messages sent and received by members of a group in accordance with one embodiment of the present invention.

Like reference numerals refer to corresponding parts throughout the several views of the drawings.

DETAILED DESCRIPTION OF THE INVENTION

Figure 1:
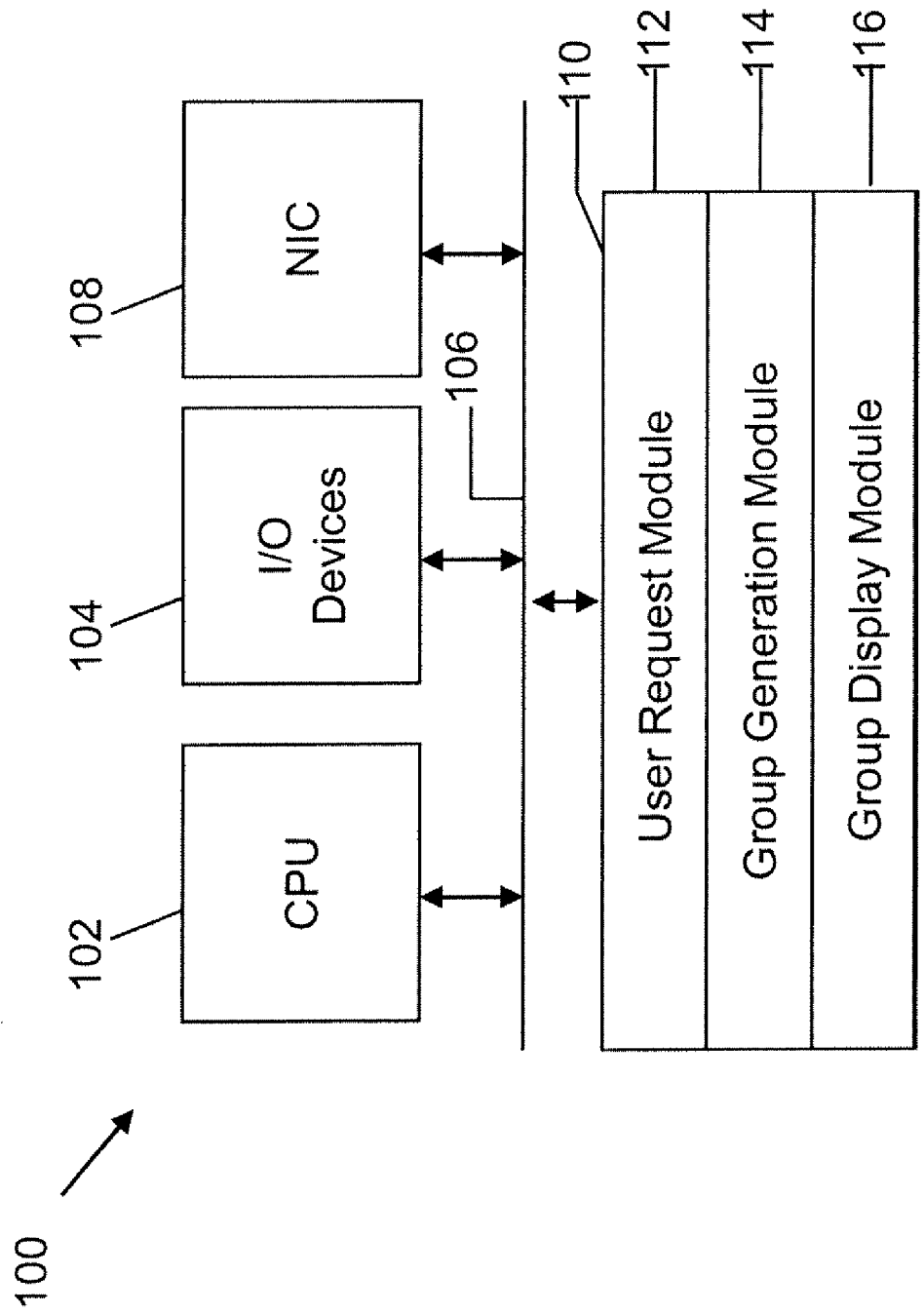
FIG. 1 illustrates a computer configured in accordance with one embodiment of the present invention.

FIG. 1 illustrates a computer configured in accordance with one embodiment of the present invention. The computer 100 includes standard components, including a Central Processing Unit (CPU) 102 and input/output devices 104, which are linked by a bus 106. The input/output devices 104 may include a keyboard, mouse, touch screen, monitor, printer, and the like. A Network Interface Circuit (NIC) 108 provides connectivity to a network (not shown), thereby allowing the computer 100 to operate in a networked environment.

A memory 110 is also connected to the bus 106. The memory 110 includes one or more executable modules to implement operations of the invention. In one embodiment, the memory 110 includes a User Request Module 112, a Group Generation Module 114 and a Group Display Module 116.

The User Request Module 112 includes executable instructions to receive a request related to a user's area of interest. The Group Generation Module 114 includes executable instructions to generate a group for the user. In one embodiment, the executable instructions to generate a group comprise executable instructions to identify users related to the area of interest. This may be an automated operation. Alternately, the group generation module 114 may be configured to receive input from another user that defines the group. The executable instructions to generate a group further comprise executable instructions to add the user as a member to the group. The Group Display Module 116 includes executable instructions to display content posted by the group.

The operations performed by the executable modules in the memory 110 are discussed in greater detail in connection with FIGS. 2-5. In a particular embodiment, the group is generated and delivered to a user using the Ginx™ application, which is a trademark of Peer News Inc. of San Jose, Calif. In one embodiment, the Ginx™ application may be implemented as a web-based client interface for an online social networking service, such as Twitter®. However, it is to be appreciated that the disclosed embodiments may also be implemented using any online social networking service that connects multiple users, such as, for example, Facebook® and MySpace®.

It should be noted that the executable modules stored in memory 110 are exemplary. Additional modules, such as an operating system or graphical user interface module may also be included. It should be appreciated that the functions of the modules may be combined. In addition, the functions of the modules need not be performed on a single machine. Instead, the functions may be distributed across a network, if desired. Indeed, the invention is commonly implemented in a client-server environment with various components being implemented at the client-side and/or server-side.

FIG. 2 is a flowchart illustrating exemplary operations performed to generate a group, in accordance with one embodiment of the present invention. In a first operation 200, a request related to an area of interest is received from a user. For example, a user may route a request to a friend that has knowledge about an area of interest. In a second operation 202, a group is generated for the user based on the area of interest. Specifically, users knowledgeable about the area of interest, referred to as domain users, are combined with the user to form a group. In one embodiment, the domain users are defined in one online application (e.g., Twitter®) and are then used in a second online application (e.g., Ginx™). Alternately, group definition and utilization may be in a single online application.

Observe that the invention allows a user to leverage the trust and knowledge of a friend in the formation of a group. A group can always be defined based upon keywords that characterize an area of interest, but this approach does not offer the selectivity, knowledge and trust that may be secured while relying upon a friend to define a group for a user.

In a third operation, 204, the group is delivered to the user. Specifically, information generated by the group is displayed to the user. In one embodiment, information updates by members of the group are displayed to the user as a time-line of messages. The operations 200-204 are more clearly understood with reference to the Graphical User Interface (GUI) screen displays shown in FIGS. 3-5.

FIG. 3 is a screen display that describes information related to creating a group, in accordance with one embodiment of the present invention. FIG. 3 also illustrates an exemplary set of messages that are exchanged between users of an online social network during the creation of a group. In the illustrated example, a user Bob initially receives a request, "I don't know who to follow", from another user Alice. The user Bob then delivers a group to the user, Alice, with a message, "Follow these 10 people, I put them into a Group for you." The user, Alice, acknowledges membership to the group with a message, "Neat, I followed your Group and they all show up in my timeline!!! So easy!"

Figure 4:
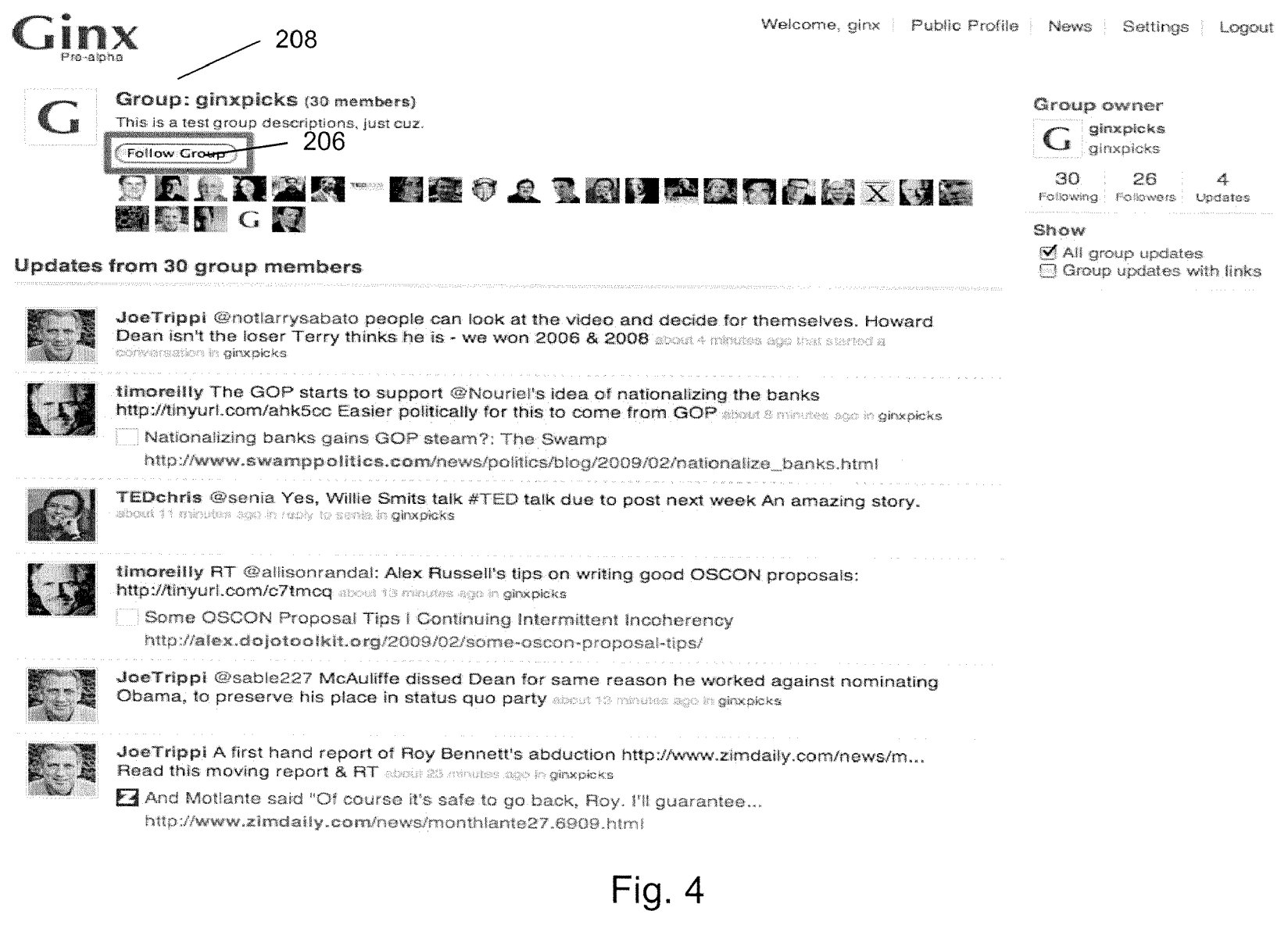

FIG. 4 is a screen that displays an exemplary group generated in response to a request from a user, in accordance with one embodiment of the present invention. As illustrated, in one embodiment, upon activation of a "Follow Group" tab 206 by the user, a group "ginxpicks" 208 is displayed to the user. As further illustrated, content updates generated by members of the group are displayed to the user.

FIG. 5 is a screen that displays a time-line of messages sent and received by members of a group, in accordance with one embodiment of the present invention. Thus, messages that are published by the members of the group may be viewed by the user in real-time in the user's time-line. In certain embodiments, a filter may be implemented to enable the user to selectively view messages from the members of the group or to entirely remove a group from the user's view.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium comprising executable instructions to:
   receive from a user a request related to an area of interest;
   generate a group for the user based on the request, wherein the executable instructions to generate a group comprise executable instructions to:
   specify domain users knowledgeable in the area of interest, wherein the executable instructions to specify domain users knowledgeable in the area of interest include executable instructions to receive from a friend of the user the domain users knowledgeable in the area of interest and thereby leverage the trust of the friend to fulfill the request,
   combine the user and the domain user to form the group; and
   deliver the group to the user, wherein the executable instructions to deliver the group comprise executable instructions to display to the user information posted by the group.

2. The non-transitory computer readable storage medium of claim 1, wherein the user and the domain users are subscribers to an online social network.

3. The non-transitory computer readable storage medium of claim 1, wherein the executable instructions to deliver the group comprise executable instructions to display a time-line of messages posted by members of the group.

4. The non-transitory computer readable storage medium of claim 1, wherein the group is formed in a first online social network and utilized in a second online social network.

5. The non-transitory computer readable storage medium of claim 1, wherein the executable instructions to generate a group include executable instructions to receive a designation of domain users knowledgeable in the area of interest from an individual specified by the user.

* * * * *